C. VOGEL.
MACHINE FOR TURNING CRANK PINS AND ECCENTRICS.
APPLICATION FILED FEB. 19, 1906.

923,219.

Patented June 1, 1909.
6 SHEETS—SHEET 1.

Witnesses
Edward Rowland
Chas H. Smith

Inventor
Charles Vogel
By his Attorney Harold Serrell

THE NORRIS PETERS CO., WASHINGTON, D. C.

C. VOGEL.
MACHINE FOR TURNING CRANK PINS AND ECCENTRICS.
APPLICATION FILED FEB. 19, 1906.

923,219.

Patented June 1, 1909.
6 SHEETS—SHEET 2.

Witnesses
Edward T. Rowland
Chas. H. Smith

Inventor
Charles Vogel
By his Attorney Harold Serrell

C. VOGEL.
MACHINE FOR TURNING CRANK PINS AND ECCENTRICS.
APPLICATION FILED FEB. 19, 1906.

923,219.

Patented June 1, 1909.

Witnesses
Edward Rowland
Chas H Smith

Inventor
Charles Vogel
By his Attorney
Harold Serrell

C. VOGEL.
MACHINE FOR TURNING CRANK PINS AND ECCENTRICS.
APPLICATION FILED FEB. 19, 1906.

923,219.

Patented June 1, 1909.
6 SHEETS—SHEET 4.

Fig. 5.

C. VOGEL.
MACHINE FOR TURNING CRANK PINS AND ECCENTRICS.
APPLICATION FILED FEB. 19, 1906.

923,219.

Patented June 1, 1909.
6 SHEETS—SHEET 5.

Witnesses
Edward Rowland
Chas H Smith

Inventor
Charles Vogel
By his Attorney Harold Serrell

UNITED STATES PATENT OFFICE.

CHARLES VOGEL, OF FORT LEE, NEW JERSEY.

MACHINE FOR TURNING CRANK-PINS AND ECCENTRICS.

No. 923,219.     Specification of Letters Patent.     Patented June 1, 1909.

Application filed February 19, 1906. Serial No. 301,760.

*To all whom it may concern:*

Be it known that I, CHARLES VOGEL, a citizen of the United States, residing at Fort Lee, in the county of Bergen and State of New Jersey, have invented an Improvement in Machines for Turning Crank-Pins and Eccentrics, of which the following is a specification.

My invention relates to such crank shafts as form parts of various devices in mechanical arts for transmitting the power of a prime mover to a driven member or mechanism, and my invention relates particularly to a mechanical structure adapted to turn crank pins and eccentrics and true the crank faces of such shafts, and the same is an improvement upon the devices shown and described in Letters Patent granted to me February 26, 1901, No. 668,863.

The objects sought in the devices of my present invention are greater latitude of adjustability, absence of lost motion, provisions for taking up wear, a variable or regular feed and a perfect alinement.

In the devices of my present invention the revoluble member or drum has no other movement than its rotation which is effected by means of suitable gears; the beds at either end of said drum are movable longitudinally of the main stationary bed of the machine. The crank shaft to be turned extends longitudinally through the drum and is carried by pillow blocks and a steady rest which in turn are supported by and are adjustable transversely of the movable beds. I provide devices for connecting these beds so as to cause them to move together in unison in either direction and the parts are so arranged that the pillow blocks may be set as measured with mathematical accuracy so as to bring the axial center of the work being turned to exactly coincide with the axial center of the revoluble drum.

I provide gear feeding devices actuated from the power shaft and acting upon one or both beds for longitudinally moving the same and in connection therewith a coupling device permits one bed to be moved and adjusted in its relation to the other one, previous to their movement in unison.

I also provide a gear of the driving train of gears for rotating the drum, having a yielding function for taking up any slack or lost motion in the gears and this drum is provided with means for taking up the wear thereof and causing it to turn without looseness or vibration.

I further provide a star cam feed for the cutter device and a manually actuated regulator and mechanically held device placed in the path of the cam feed to a greater or lesser extent so as to act thereon in proportion to the extent of the feed desired, all of which is hereinafter particularly set forth.

In the drawing, Fig. 2 is a plan view of the same. Fig. 11 is a side elevation, Fig. 12 a surface elevation and Fig. 13 is a vertical section of the gear of the train of gears having a yielding function to take up the slack or lost motion, the section Fig. 13 being at the dotted line X', X', of Fig. 12. Fig. 14 is a plan and partial section through the feeding device for the cutter bar of the drum in a larger size, the relation of which is apparent from Figs. 1 and 2. Fig. 15 is an elevation in larger size of the devices for changing the direction of feed of the beds, while

The main stationary bed of the machine is advantageously hollow and comprises a lower portion $a$ with rising ends $a^1$, $a^2$ and a rising central portion $a^3$, in the upper surface of which is a transverse groove $a^4$. The sliding beds $b$, $c$, are supported upon the bed ends $a^1$, $a^2$; each bed is provided with transverse double-faced grooves $b^1$, $c^1$ and with substantially centrally longitudinal racks $b^2$, $c^2$ which with their adjacent ribs are guided in longitudinal grooves of the bed ends $a^1$, $a^2$.

Figure 3:
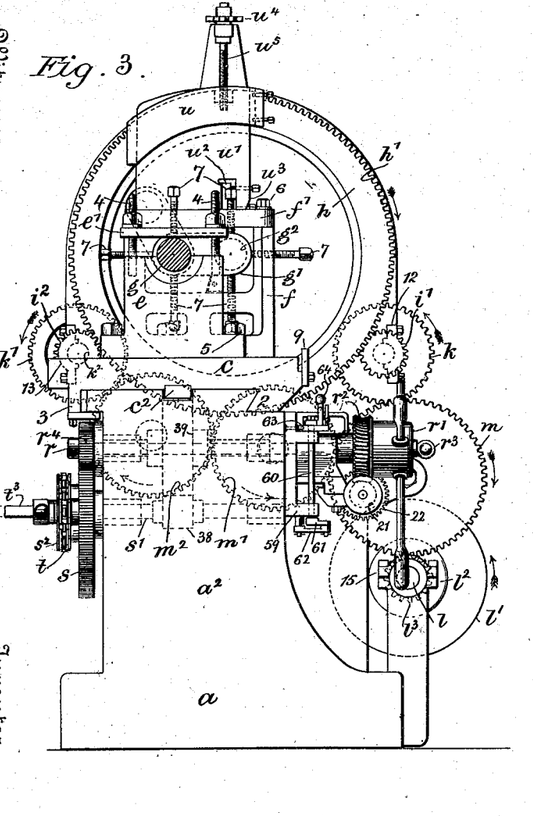
Fig. 3 is an elevation at the left hand end of the machine; the crank shaft being in section.
Figure 4:
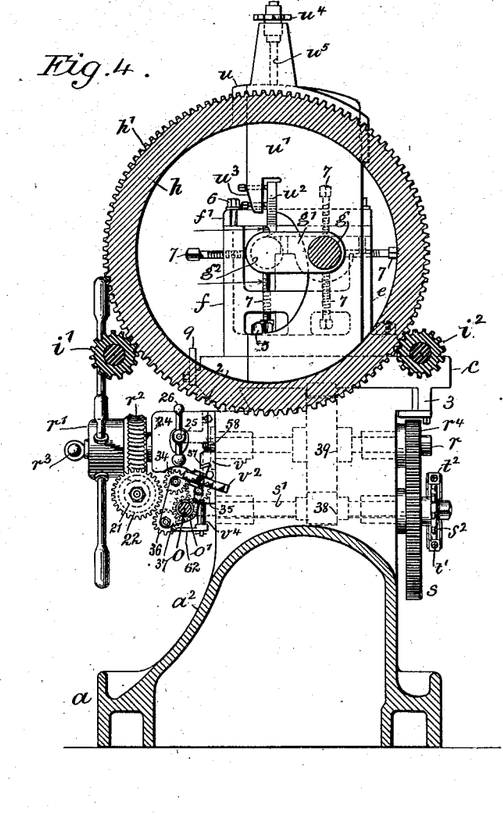
Fig. 4 is a vertical section upon the dotted line Y, Y, Fig. 1, looking in the direction indicated by the arrow adjacent to said line.
Figure 5:
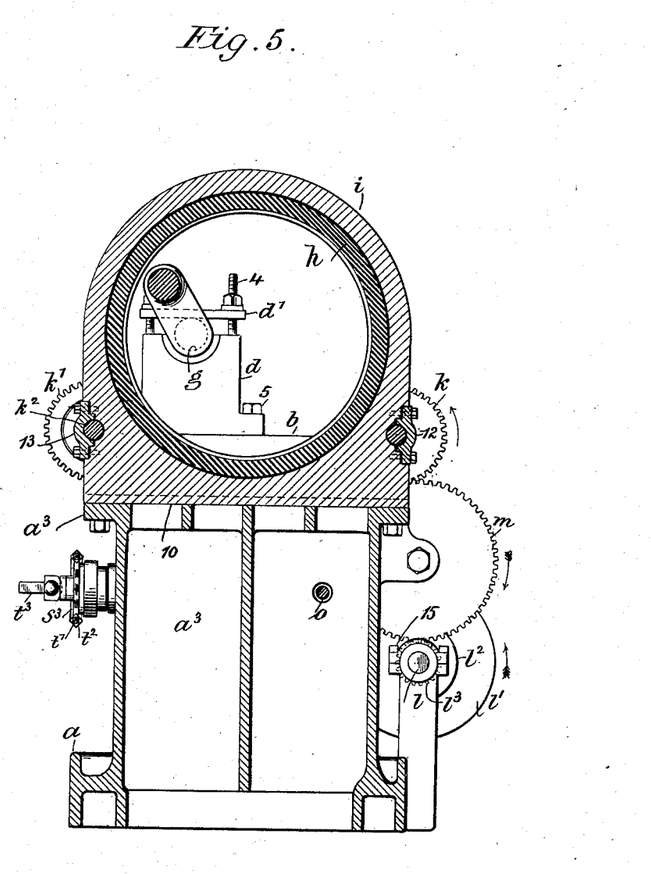
Fig. 5 is a vertical section through the revoluble member on the dotted line Z, Z, Fig. 1 looking in the direction of the arrow adjacent thereto.

Each sliding bed $b$, $c$, is provided along one edge with an overhanging portion 2 engaging the undercut edges of the bed ends, and the opposite sides of the sliding beds are each provided with a skirt 3 to which is connected a plate shown in Figs. 3 and 4 taking underneath the shouldered portions of the bed ends.

Figures 7, 8, 9, 10:
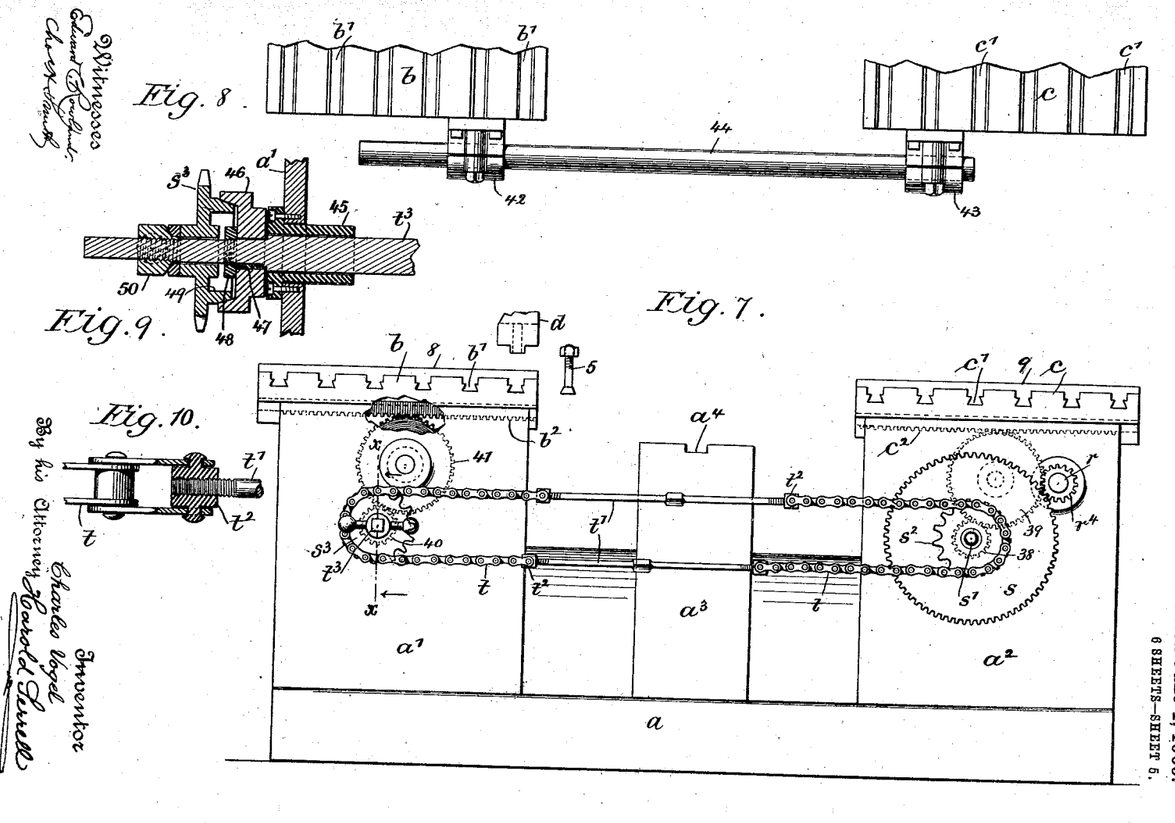
Fig. 7 is a side elevation showing as a form of my invention a means for connecting the movable beds so as to cause them to move in unison.
Fig. 8 is a clamp at one side of the machine showing the parts of the two movable beds and a form of my invention for connecting the same together to move in unison.
Fig. 9 is a vertical longitudinal section on the dotted line X, X, of Fig. 7 looking in the direction of the arrow and of said parts in larger size.
Fig. 10 is a sectional plan in larger size of the connection of the rod and chain end shown in Fig. 7.

I employ pillow blocks $d$, $e$, resting upon and supported by the sliding beds $b$, $c$; each pillow block being provided with a ribbed base as shown in Fig. 7 to fit a groove of the bed and I provide bolts 5 with tapering heads, each adapted to fit in the lower portion of a transverse groove and pass up through the lower portion of the pillow blocks with a nut on the upper end to securely clamp the same in position.

The pillow blocks $d$, $e$, are provided with cap plates $d^1$, $e^1$, and with bolts 4 adapted to connect the said cap plates securely to the pillow blocks when said cap plates extend over the crank shaft $g$ resting in said pillow blocks and for the purpose of clamping said crank shaft securely in position.

Figures 1, 6:
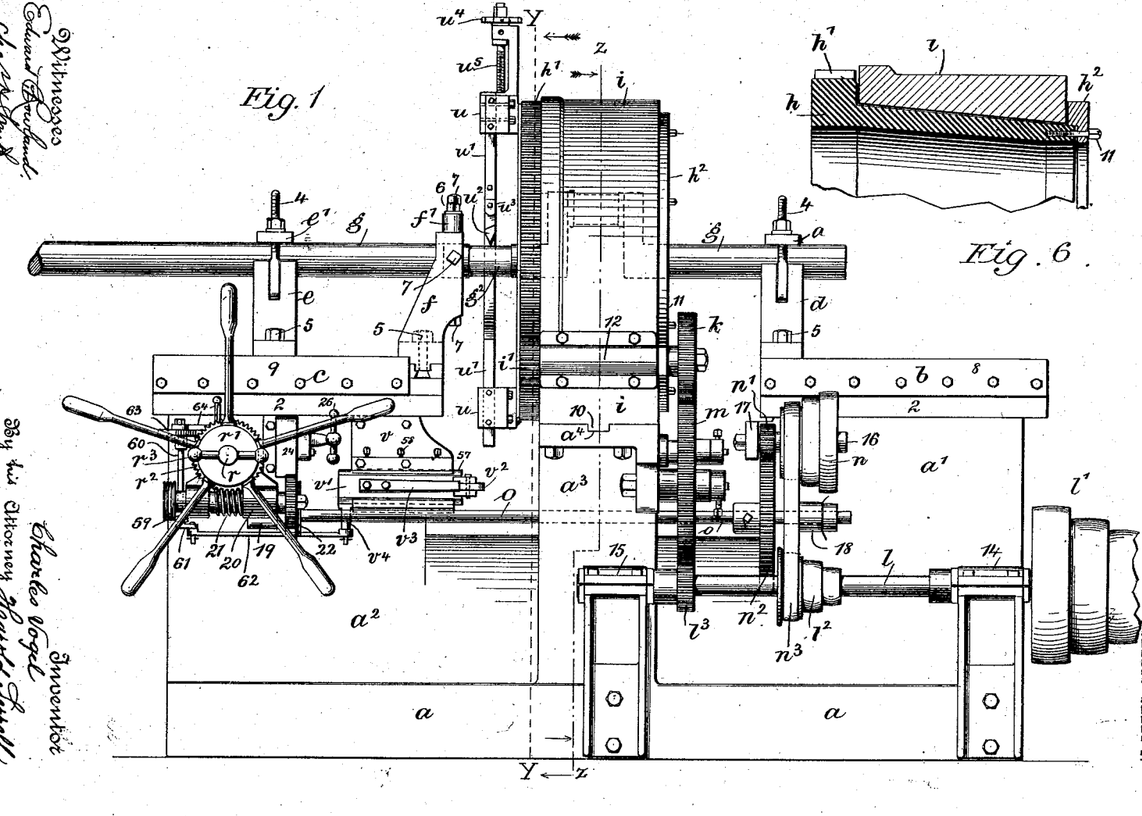
Figure 1 represents an elevation of one side of the machine of my improvement.
Fig. 6 is a vertical longitudinal section through the revoluble member and the part of the machine within which it turns on a larger scale.

$f$ represents a steady rest with a ribbed base adapted to fit the upper portion of a groove of the sliding bed $c$ and to be connected by bolts 5 similar to the bolts 5 hereinbefore mentioned secured in position on said bed. This steady rest is provided with a cap plate $f^1$ secured thereto by the tap bolts 6. I have shown and prefer to employ in connection with this steady rest a series of substantially radially placed centering and clamping bolts 7, two of which pass down through the cap plate $f^1$, two up through the lower portion of the steady rest and two through the vertical side members for the purpose of receiving and supporting and fixing in position the crank $g^1$ of the crank shaft secured in the machine; and $g^2$ Fig. 1 represents the crank pin that is being turned by the cutting tool.

Along one edge of each of the sliding beds $b$, $c$, I secure guide plates 8, 9, by suitable bolts (see Figs. 1 to 4).

The pillow blocks are provided with suitable removable bushings for shafts of various diameters; the bushings fitting the pillow blocks snugly receive the shaft to be turned, therefore the center of a shaft to be turned always bears the same relation to the pillow blocks and to the end of the pillow blocks coming next to the said guide plates 8, 9, and the parts are so proportioned that when the pillow blocks are brought right up snugly against the plates 8, 9, their shaft centers exactly agree with the axial center of the drum or revoluble member $h$ and when these pillow blocks are otherwise set they should be in such position as to be at exactly the same distance from the said guide plates 8, 9, otherwise they would not be strictly in alinement and their alinement would not be strictly in a plane parallel with a plane passing through the axial center of the drum or revoluble member $h$; these positions and measurements being strictly essential for the accurate placing of the work.

The steady rest $f$ in its relation to the shaft supported by the pillow blocks is to be so placed as to receive one side of the crank, the pin of which is being turned by the cutting tool; said steady rest serving materially to take up and counteract the strain of cutting the crank pin, and the bolts 7 thereof being readily positioned so as to accurately support and hold said crank.

The drum $h$ or revoluble member is cylindrical and tubular and in the cross section Fig. 6, off-set and tapering, and it is received in a head block $i$ supported upon the center bed $a^3$ of the machine; this head block $i$ preferably having a rib 10 received in the groove $a^4$ of the center bed; bolts shown in Fig. 1 being employed to secure this head block in position. This drum at one end is provided with a peripheral gear $h^1$ which forms the off-set portion of the drum coming against the face of the head block, (see Fig. 6) and at the other end of the drum I provide an off-set adjustable clamping ring $h^2$ connected by the tap bolts 11 to the drum and adapted to take up any wear of the drum caused by continual use.

I provide pinions $i^1$, $i^2$, one at either side of the machine meshing with the gear $h^1$, and these pinions are on shafts in the bearing plates 12, 13, secured to the opposite sides of the head block $i$; there being gears $k$, $k^1$ on the opposite ends of these shafts so that in the operation of the machine when the gears $k$, $k^1$ are rotated, their shafts and the pinions $i^1$, $i^2$, are also rotated to turn the drum or revoluble member within the head block.

A power shaft $l$ is provided and there are bearings 14, 15, therefor upon the sides of the bed of the machine. This power shaft is driven by a belt around the stepped-pulleys $l^1$ and on this power shaft $l$ there are other and smaller stepped-pulleys $l^2$ and a pinion $l^3$. The pinion $l^3$ meshes with a gear wheel $m$ of a train of gears $m$, $m^1$, $m^2$, having suitable shaft bearings on the bed center $a^3$; the gears $m$, $m^1$, $m^2$, meshing with one another. The gear $m$ meshing with the gear $k$ and the gear $m^2$ with the gear $k^1$ and by these gears the rotation and power of the shaft $l$ is transmitted to the said train of gears, the gears $k$, $k^1$ and the pinions $i^1$, $i^2$ to rotate the drum or revoluble member and the proportion of said gears is so arranged that exactly the same speed of rotation is imparted to the gears $k$, $k^1$, their shafts and the pinions $i^1$, $i^2$.

Figures 2, 11, 12, 13, 14:
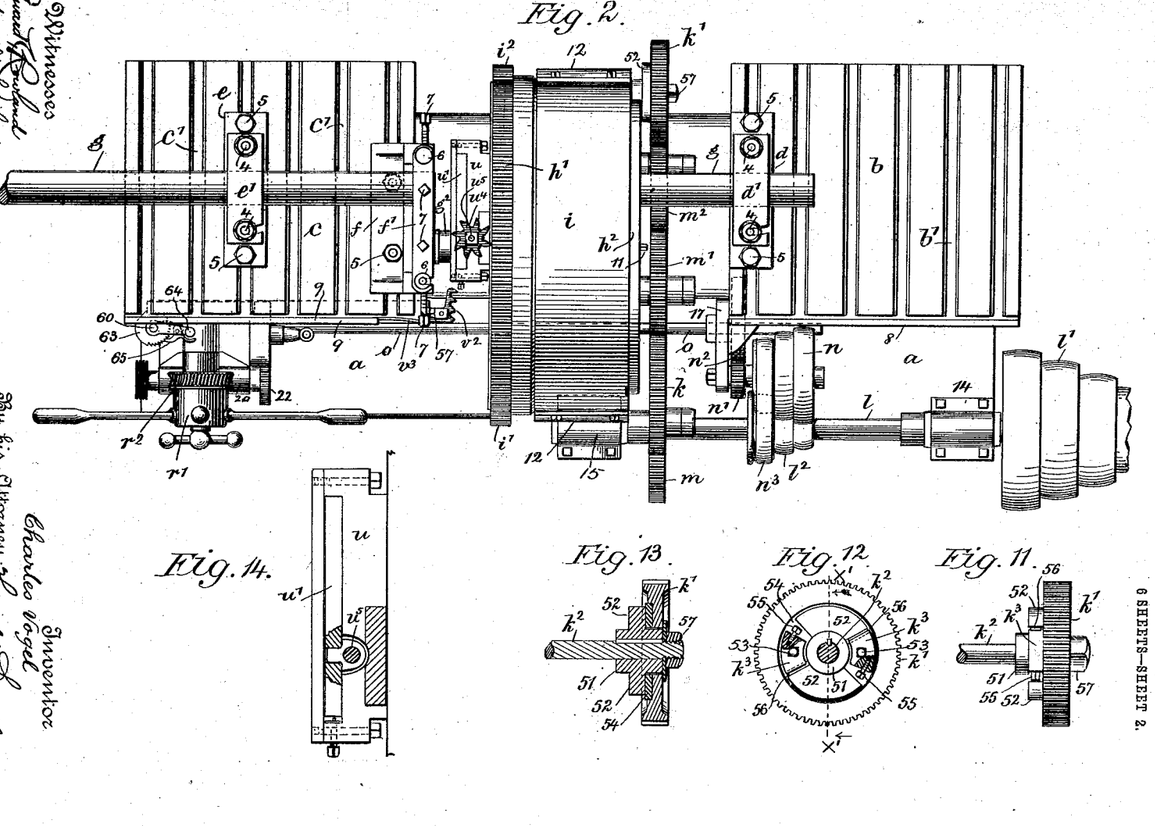

To a bracket 17, Figs. 1 and 2, secured to the bed end $a^1$ I connect a fixed shaft 16 and on a sleeve mounted on said shaft are the stepped-pulleys $n$ and pinion $n^1$; the same being rotated by a belt $n^3$ passing around the stepped-pulleys $l^2$ and $n$, the power and rotation of the power shaft being thus transmitted.

I provide a shaft $o$ in bearings 18, 19, secured to the bed ends $a^1$, $a^2$. On this shaft at one end is a gear $n^2$ meshing with the pinion $n^1$ and by this gear rotation is communicated to the shaft $o$, and on the other end of this shaft $o$ is a gear $o^1$ and intervening sleeve $o^2$.

I provide brackets 20 secured to the end $a^2$ and on these brackets there is a shaft carrying a worm 21 and on the right hand end of this shaft (see Fig. 1) is a gear 22. The worm 21 meshes with the worm wheel $r^2$ on the shaft $r$ that passes transversely of the bed end $a^2$ of the machine in suitable bearings provided therefor. On this shaft $r$ and adjacent to the worm wheel $r^2$ is a hub $r^1$ with radial arms, and I provide clamp arms $r^3$ upon the end of this shaft adjacent to the hub $r^1$ and a pinion $r^4$ on the opposite end of the shaft $r$ on the other side of the machine.

Figure 15:
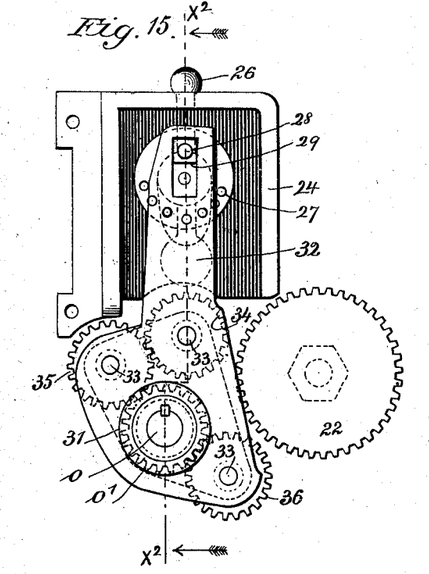
Figure 16:
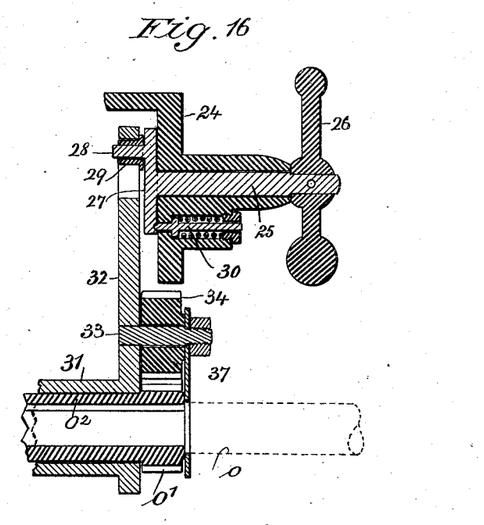
Fig. 16 is a vertical section of the parts shown in Fig. 15 on the dotted line $X^2$, $X^2$, looking in the direction of the arrow.

Referring particularly to Figs. 15 and 16, a bracket 24 is secured to the bed end $a^2$ and the same is provided with a sleeve for the shaft 25. On the outer end of this shaft 25 is a hand wheel 26 or handle and on the other end a disk 27 having a pin 28 passing through a sliding bushing or bearing block 29 movable in a slot of the arm 32. In this bracket 24 I provide a spring latch device 30 whose end is adapted to engage one of several recesses of the disk 27. On the sleeve $o^2$ of the shaft $o$ is a sleeve 31 preferably formed integral or connected with the arm 32, and the gears 34, 35 and 36 are secured to this arm 32 upon pins 33; there being outside of the gears a plate 37 so that between the arm 32 and the plate 37 there are the gears 34, 35, 36 and $o^1$; 34 and 35 being in mesh,—35 in mesh with $o^1$ and 36 also in mesh with $o^1$. The sleeve 31 is arranged to turn on the sleeve $o^2$ of the shaft $o$ and the hand wheel 26, the disk 27, the pin 28 and the bushing 29 are the means for turning this sleeve 31 and attached arm 32 and the spring latch the means for holding the same as set, the object sought being to rock the arm 32 so as to connect either the gear 34 with the gear 22 so as to transmit the feed movement received from the power shaft $l$ through the stepped-pulleys $l^2$ and $n$, and the gears $n^1$ and $n^2$, to the sliding beds in one direction or through the meshing of the gears 36 and 22 to transmit the feed in the other direction. Upon returning the parts to the position shown in Fig. 15, when neither gear 34 or 36 is in mesh with the gear 22; (the parts being in a vertical position:) then in this position the devices operating the gear 22 and said gear would be free to rotate without doing any work, therefore by the turning of the handle 26 and the disk 27 with the pin 28 in one direction, the gears 34 and 22 are brought into mesh and in the opposite direction the gears 36 and 22 are brought into mesh.

By the devices just described the feed communicated by the power shaft and by intermediate devices to the shaft $o$ is communicated in one direction by the gear 36 to the gear 22 or by the gear 35 and 34 to the gear 22 in the opposite direction because of the use of an intermediate gear 35.

When the parts are in the disconnected position shown in Figs. 15 and 16 a hand feed to a limited extent may be effected by means of the hub and radial arms $r^1$ made effective on the shaft $r$ by releasing the friction clamping device $r^3$, which is the same as that shown in Fig. 5 of my Letters Patent No. 668,863.

In addition to the parts just described, other feed devices comprise the following (referring particularly to Figs. 3, 4 and 7): The pinion $r^4$ on the shaft $r$ meshes with a gear $s$ of very much greater size which is upon a shaft $s^1$ passing through the bed end of the machine in suitable bearings. On the same shaft outside of the gear $s$ there is a sprocket $s^2$ and on the same shaft inside of the hollow bed end there is a pinion 38 meshing with a gear 39, which in turn engages the rack $c^2$ of the longitudinally movable bed $c$. This gear 39 is on a suitable shaft in suitable bearings and by these devices the bed $c$ may be moved longitudinally.

The bed $c$ and the bed $b$ where light work is to be performed may to advantage be connected as shown in Fig. 8, that is, by the bar 44 at one end secured in the clamp head 42 on one side of the bed $b$ and at the other end secured in the clamp head 43 on one side of the bed $c$; the two beds moving together in unison by these means.

For larger or heavier work I prefer the structure shown in Fig. 7 in which the sprocket $s^2$ on the shaft $s^1$ is employed and a sprocket $s^3$ on a shaft $t^3$ passing through the bed end $a^1$ in suitable bearings is employed in connection with a chain $t$ which passes around the sprockets so as to communicate the rotation and the power of the shaft $r$ and shaft $s^1$ to the shaft $t^3$.

As shown in Fig. 7, chain members $t$ are connected centrally by bars $t^1$ with threaded ends in opposite directions engaging couplers $t^2$ for the purpose of providing a tension to the chain $t$ so that there will be no lost motion. The central portions of the bars $t^1$ being by preference squared for the application of a wrench or similar instrumentality for turning the same.

Upon the shaft $t^3$ within the hollow bed end $a^1$ is a pinion 40 meshing with a gear 41 on a suitable shaft having suitable bearings in said bed end; the gear 41 meshing with the rack $b^2$ of the bed $b$ and by these devices the beds $b$ $c$ are moved in similar directions simultaneously.

Referring to Fig. 9 with reference to the shaft $t^3$ and sprocket $s^3$ I provide a bearing sleeve 45 in the hollow bed end $a^1$ for this shaft. A clutch member 46 is connected to the shaft $t^3$ by a key 47 and a lock nut 48 and a sprocket $s^3$ is provided with the clutch member 49 adapted to engage the clutch member 46 frictionally so as to communicate the power and rotation of the chain $t$ by the clutch device to the shaft $t^3$; the coupling handle 50 threaded on the outer end of the shaft $t^3$ being employed for forcing the sprocket and its clutch member 49 in forceful contact with the clutch member 46 for the performance of this function.

Referring now to the train of gear devices for rotating the drum $h$ or revoluble member, which gears carry the reference letters $m$, $m^1$, $m^2$ and engage the gears $k$, $k^1$, I construct the gear $k^1$ in a peculiar manner. (See especially Figs. 11 to 13 inclusive.) Upon the shaft $k^2$ of said gear $k^1$ I secure a hub 51 provided with two opposite segment members 52 and the web of the gear $k^1$ is received around this hub 51 and is held in place on the shaft longitudinally by a nut and washer 57. A disk 54 fits within the recessed face of the web of the gear $k^1$ back of the segments 52 and to this disk 54 I secure segments $k^3$ oppositely placed and held by bolts 53, which pass through the segments $k^3$ through the disk 54 into the web of the gear $k^1$, thus making the gear $k^1$ loose on the shaft $k^2$; the looseness being controlled by the spaced apart relation of the segments $k^3$ with regard to the segments 52 of the hub 51. In corresponding edges of the segments $k^3$ I place tap bolts 55 and in the opposite corresponding edges of the segments $k^3$ rubber blocks 56; these edges of the segments $k^3$ being recessed for said blocks so as to prevent accidental displacement. The blocks 56 contact with the adjacent surfaces of the segments 52 and $k^3$, and the bolts 55 being unscrewed just sufficient for the heads thereof to come into a close relation with the adjacent edges of the segments 52.

In Fig. 12 there is an arrow on the gear $k^1$ showing its direction and motion and as it is turned by the train of gears hereinbefore described, the disk 54 and segments $k^3$ turn with it, consequently the rotary movement communicated therefrom to the shaft $k^2$ is through the rubber blocks 56 and hub 51 and so by the shaft $k^2$ to rotate the pinion on the other end of said shaft. By this device I take up the slack of the train of gears and provide for any uneven movement with respect thereto and to the gear $k^1$.

Referring particularly to Figs. 1, 2, 3, 4, and 14, $u$ represents the cutter frames secured at opposite points of the drum $h$; $u^1$ the cutter bar movable in said frames; $u^2$ the cutting tool in the jaw $u^3$ of said bar. These parts are held in position by the screw stem $u^5$ engaging the upper end of the cutter bar $u^1$ and the feed of said cutter bar and cutter being produced by the rotation of this screw stem and the star cam $u^4$ at the upper end of said stem.

Figure 17:
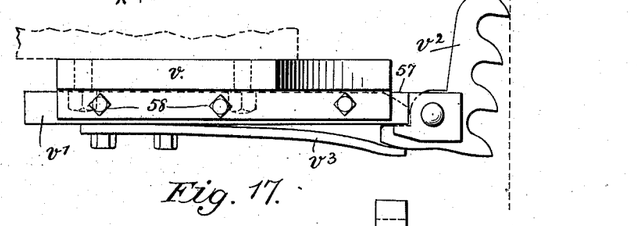
Fig. 17 is a plan and Fig. 18 an edge elevation looking at the right hand side of the parts Fig. 17, showing the devices manually actuated and regulated with which the star feed comes in contact once every revolution of the drum or revoluble member; parts of Fig. 17 and 18 are of the same size but of exaggerated size over the similar parts shown in Fig. 2.
Figure 18:
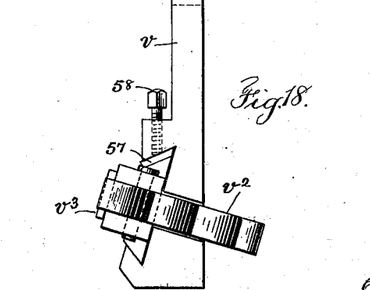

I provide yielding manually actuated devices for turning the star cam for effecting this feed, which devices are shown particularly in Figs. 17 and 18 in which $v$ is a frame secured on the surface of the bed end $a^2$ and having slideways in which is a slide-plate $v^1$ with beveled edges. A plate 57 also being employed with bolts 58 to take up any lost motion and provide a snugness of longitudinal movement for the slide-plate $v^1$. To the right hand end of this slide-plate $v^1$ is connected a pivot rack $v^2$ shown as provided with four teeth and a spring $v^3$ bolted to the face of the slide-plate $v^1$, bears at its free end upon the pivoted rack $v^2$; a depending post $v^4$ is formed at the opposite end of the slide-plate $v^1$, and I provide in a bracket 59 secured upon the surface of said bed end a rod 60 at the lower end of which is a crank 61, and a rod 62 is at its respective ends pivotally connected to the crank 61 and to the post $v^4$.

I provide a disk 63 having rack teeth on its periphery, which disk overlies the upper part of the bracket 59 and is secured thereto. The rod 60 passes through the bracket and through this disk and attached to its upper projecting end is a crank arm and handle 64 to which is pivoted a spring pawl 65. Longitudinal movement imparted to the slide-plate $v^1$ is given by the crank arm 64, rod 60, crank 61, rod 62 and post $v^4$, and the position in which this slide-plate $v^1$ and pivoted rack $v^2$ on the end thereof are placed is held by the spring pawl 65 which is of course to be disengaged from the rack teeth of the disk 63 to change the position of the slide-plate $v^1$ and its pivoted rack. In the operation of these parts for effecting the feed of the cutting tool it will be apparent, especially with reference to Figs. 1 and 2, that when the drum in its rotation brings the star cam $u^4$ into the path of the rack $v^2$ that the same will engage the rack and will be turned and that this turning movement will turn the screw stem $u^5$ and feed the cutting tool.

In Fig. 17 I have shown a straight dotted line at right angles to the plane of the slide-plate $v^1$ so as to indicate the difference of angle between said line and the edges of the teeth of the rack $v^2$. This rack is adapted to yield so that the line of its teeth will become parallel with this dotted line, but of course when released the spring $v^3$ will return the rack to this initial position. It will therefore be apparent that in the rotation of the drum a tooth of the star cam would in the position of the parts, (Fig. 17) come into engagement with the last tooth of the rack $v^2$. Also if this rack is moved farther to the right the teeth of the star cam will engage two or more of the teeth of the rack, and if the rack is moved farther to the right it is possible for the teeth of the star cam to engage all of the teeth of the rack so that instead of turning one or two teeth it will turn four teeth and so increase the feed. This longitudinal movement of the rack $v^2$ as hereinbefore described, being effected by the crank arm and handle 64. Any number of teeth desired may be employed on the rack $v^2$. The yielding function of the rack $v^2$ is further useful in two ways viz: in producing a striking and turning device for the star cam $u^4$ that is not unyielding because an unyielding device produces a hammer-like blow, whereas with the device of my invention the contact is easily and gradually made and without injury to the parts, and further should the rack $v^2$ be accidentally and unintentionally moved too far into the path of the star cam effecting too great a movement and feed which would tend to force the cutting tool deep into the work, said rack requiring less force for its movement than the cutting tool would be swung completely back out of the way, the star cam passing by without doing any actual work.

From the foregoing description and from the illustration, it will be apparent that the crank shaft to be trued and worked by the cutting tool passes through the hollow drum, is supported and its position determined by the placing of the pillow blocks $d$, $e$, and by the steady rest $f$; that the rotation of the drum and the cutting tool carried thereby are effected by the power shaft $l$, the train of gears operated thereby and the gears $k$, $k^1$, and $i^1$, $i^2$; that any wear produced by the constant use of the rotary drum is taken up by means of the clamp ring $h^2$ and the bolts 11; that rotation and power are communicated by the stepped-pulley on the power shaft and the belt $n^3$ to the stepped-pulley $n$, pinion $n^1$, gear $n^2$ and shaft $o$ to the gear 22.

Through the intervention of the devices shown in Figs. 15 and 16 the worm 21 and worm wheel $r^2$ by the shaft $r$ and the devices shown in Figs. 7 and 8 are caused to move the longitudinally movable beds $b$, $c$, in unison. A tension is applied to the power chain, Fig. 7, by the devices shown in Figs. 7 and 10. The movement transmitted from the devices co-acting with the bed $c$ is made effective with the bed $b$ or disconnected by the clutch device shown in Fig. 9; that a yielding movement with regard to the train of gears is effected by the device shown in Figs. 11 to 13 inclusive and that the feed of the cutting tool is effected by the star cam $u^4$ and the rack $v^2$ with every revolution of the drum by the position to which the rack $v^2$ is manually placed by the device described in connection therewith.

I claim as my invention:

1. In a turning machine for cranks and eccentrics, the combination with a main bed, a central revoluble drum in an elevated position and longitudinally movable beds at the opposite ends of the main bed also in elevated positions, of a bar longer than the intervening gap between the longitudinally movable beds and means for rigidly connecting the said bar near its opposite ends to the sides of the said movable beds and means for actuating one of said beds and through said bar the other bed.

2. In a turning machine for cranks and eccentrics, the combination with the longitudinally movable beds, a shaft $r$ and means for turning said shaft, of a pinion on said shaft, a shaft $s^1$, a gear on said shaft meshing with said pinion, a pinion on the shaft $s^1$, a gear meshing therewith and a rack on one of said beds with which the latter pinion is in mesh, a shaft $t^3$, sprockets on the shafts $s^1$ and $t^3$ and a chain passing around over the same, a pinion on the shaft $t^3$, a gear meshing therewith and a rack on the other longitudinally movable bed meshing with the latter gear whereby the rotary movement and the power from the first shaft transmitted to one bed is simultaneously and to the same extent transmitted to the other beds for moving the beds in unison.

3. In a turning machine for cranks and eccentrics, the combination with a revoluble drum, its cutter bar and cutting tool, of a feed screw and star cam secured to the drum for effecting the feed of the tool with the rotation of the drum, a pivoted rack and movable support therefor secured to the side of the bed of the machine and adjustable toward the path of the star cam and manually operated devices for placing and holding said pivoted rack in position.

4. In a turning machine for cranks and eccentrics, the combination with a revoluble drum, its cutter bar and cutting tool, of a feed screw and star cam secured to the drum for effecting the feed with the rotation of the drum, a frame having slide-ways and a slide-plate therein, the latter arranged to move toward and from the plane of movement of the star cam, a pivoted rack secured to one end of said slide-plate, a spring for maintaining the said rack in a predetermined position; a disk with a rack edge, a crank arm, a pawl and rod manually actuated and a crank rod connecting the same to the said slide-plate whereby the pivoted rack is moved or returned into the desired position and held, or is moved out of the way of the star cam at the pleasure of the operator.

5. In a turning machine for cranks and eccentrics, the combination with a revoluble moving cutting tool and a star cam for effecting the feed movement thereof, of a pivoted spring held rack adapted to be engaged by the star cam in its movement, substantially as described, and means for effecting and controlling the movements of the said rack and so adjusting its position with respect to the plane of the path of the star cam.

Signed by me this 16th day of February 1906.

CHARLES VOGEL.

Witnesses:
   GEO. T. PINCKNEY,
   E. ZACHARIASEN.